United States Patent
Ishii

(10) Patent No.: US 9,848,117 B2
(45) Date of Patent: Dec. 19, 2017

(54) FOCUS CONTROL APPARATUS, METHOD THEREFOR, AND STORAGE MEDIUM

(71) Applicant: CANON KABUSHIKI KAISHA, Tokyo (JP)

(72) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/000,790

(22) Filed: Jan. 19, 2016

(65) Prior Publication Data

US 2016/0212323 A1    Jul. 21, 2016

(30) Foreign Application Priority Data

Jan. 20, 2015  (JP) ................................. 2015-008957

(51) Int. Cl.
*H04N 5/232* (2006.01)
*G02B 7/36* (2006.01)
*H04N 5/235* (2006.01)
*H04N 9/04* (2006.01)

(52) U.S. Cl.
CPC .......... *H04N 5/23212* (2013.01); *G02B 7/36* (2013.01); *G02B 7/365* (2013.01); *H04N 5/2351* (2013.01); *H04N 9/045* (2013.01)

(58) Field of Classification Search
CPC .... H04N 5/23212; H04N 5/2351; G02B 7/36; G02B 7/365
See application file for complete search history.

(56) References Cited

U.S. PATENT DOCUMENTS

| 7,873,267 | B2 * | 1/2011 | Kusaka | G02B 7/36 348/345 |
| 8,018,524 | B2 * | 9/2011 | Kawarada | G03B 7/28 348/350 |
| 8,525,917 | B2 * | 9/2013 | Taniguchi | G02B 7/34 348/220.1 |
| 8,767,118 | B2 * | 7/2014 | Yamasaki | G03B 3/10 348/349 |
| 8,854,529 | B2 * | 10/2014 | Yoshimura | H04N 5/23212 348/222.1 |

(Continued)

FOREIGN PATENT DOCUMENTS

| JP | 09-054242 A | 2/1997 |
| JP | 2001-004914 A | 1/2001 |

(Continued)

*Primary Examiner* — Nicholas Giles
(74) *Attorney, Agent, or Firm* — Cowan, Liebowitz & Latman, P.C.

(57) ABSTRACT

A focus control apparatus, comprises an area setting unit that sets a plurality of divided areas by dividing in a first direction and in a second direction, the first direction corresponding to a direction in which a focus state is detected; a focus detection unit that detects first information related to the focus state; a calculation unit that calculates defocus information on the basis of the first information; and a control unit that performs focus control on the basis of the calculated defocus information, wherein in a first mode in which the defocus information for the focus control is calculated by combining pieces of the first information, the calculation unit causes the part of the plurality of divided areas to vary in accordance with pieces of the first information.

22 Claims, 13 Drawing Sheets

(56) References Cited

U.S. PATENT DOCUMENTS

| | | | | |
|---|---|---|---|---|
| 8,970,773 | B2* | 3/2015 | Nagano | H01L 27/14607 348/345 |
| 9,048,152 | B2* | 6/2015 | Kishi | G02B 7/34 |
| 9,307,136 | B2* | 4/2016 | Uchida | H04N 5/23212 |
| 2009/0115882 | A1* | 5/2009 | Kawarada | G03B 7/28 348/340 |
| 2009/0256952 | A1* | 10/2009 | Kusaka | G02B 27/16 348/349 |
| 2010/0165176 | A1* | 7/2010 | Taniguchi | G02B 7/34 348/345 |
| 2010/0214452 | A1* | 8/2010 | Kawarada | G02B 7/346 348/255 |
| 2011/0008031 | A1* | 1/2011 | Kusaka | G03B 13/28 396/100 |
| 2011/0085786 | A1* | 4/2011 | Tamaki | G03B 13/36 396/104 |
| 2013/0076970 | A1* | 3/2013 | Kishi | G02B 7/34 348/349 |
| 2013/0107086 | A1* | 5/2013 | Nagano | H01L 27/14607 348/273 |
| 2013/0147998 | A1* | 6/2013 | Yoshimura | H04N 5/23212 348/302 |
| 2013/0216199 | A1* | 8/2013 | Nakajima | H04N 5/23212 386/224 |
| 2013/0250154 | A1* | 9/2013 | Hirose | H04N 5/23212 348/311 |
| 2013/0335618 | A1* | 12/2013 | Sugawara | H04N 5/23212 348/349 |
| 2014/0049666 | A1* | 2/2014 | Tsutsumi | H04N 5/2621 348/239 |
| 2014/0055642 | A1* | 2/2014 | Uchida | H04N 5/357 348/231.99 |
| 2014/0284449 | A1* | 9/2014 | Uchida | H04N 5/2254 250/201.2 |
| 2014/0368696 | A1* | 12/2014 | Uchida | H04N 5/3651 348/234 |

FOREIGN PATENT DOCUMENTS

| | | |
|---|---|---|
| JP | 2001-083407 A | 3/2001 |
| JP | 2014-032214 A | 2/2014 |

* cited by examiner

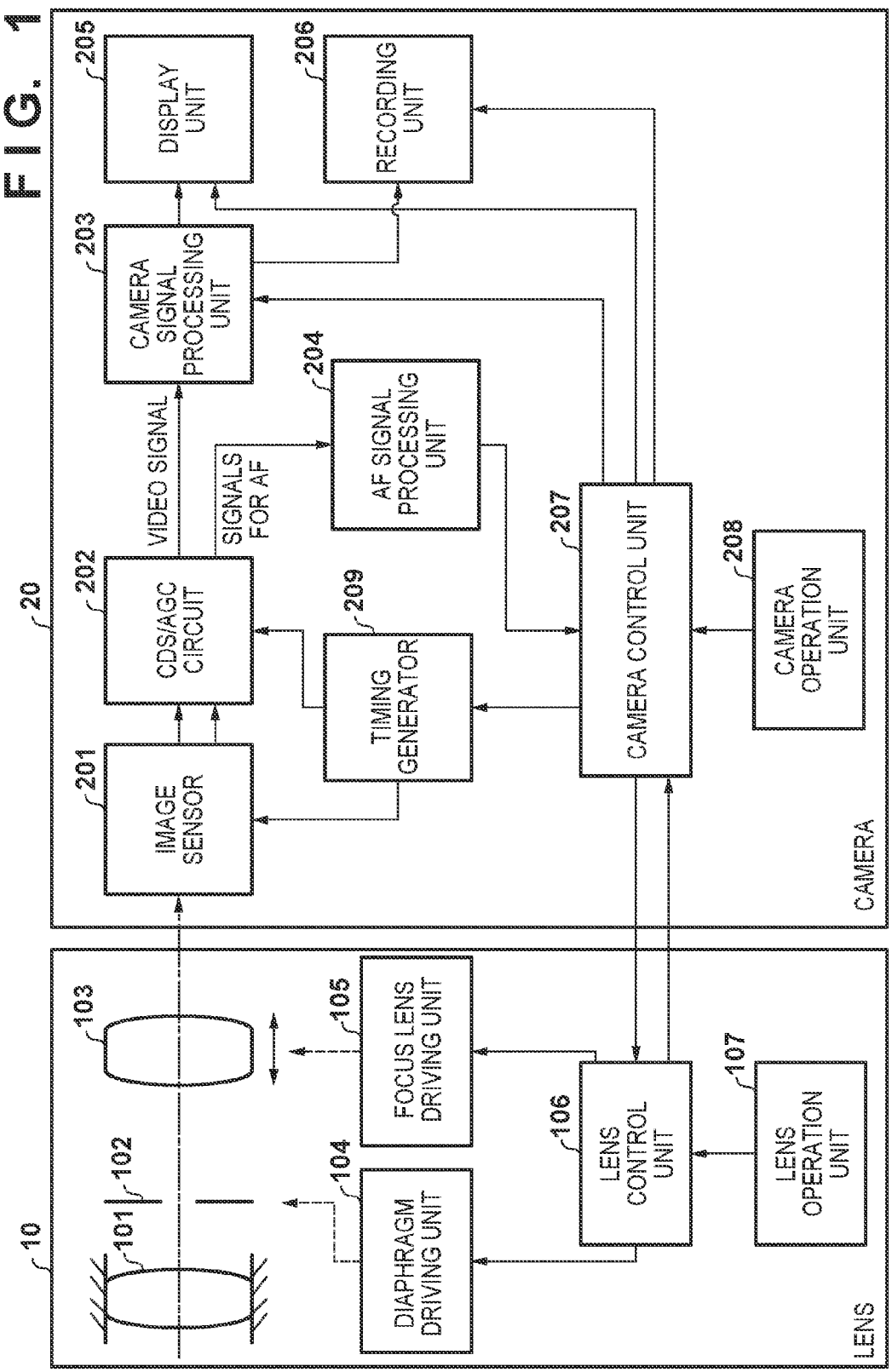

FIG. 2A

PIXEL STRUCTURE FOR METHOD OTHER THAN
IMAGING SURFACE PHASE-DIFFERENCE METHOD

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG. 2B

PIXEL STRUCTURE FOR IMAGING SURFACE PHASE-DIFFERENCE METHOD

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

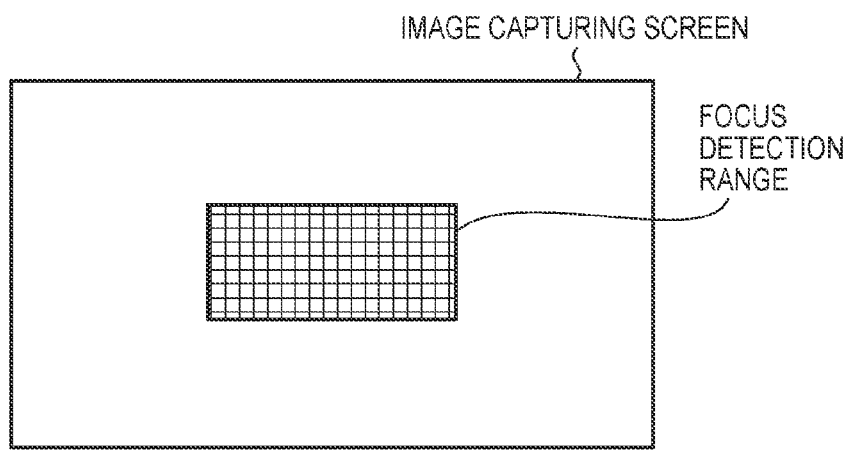

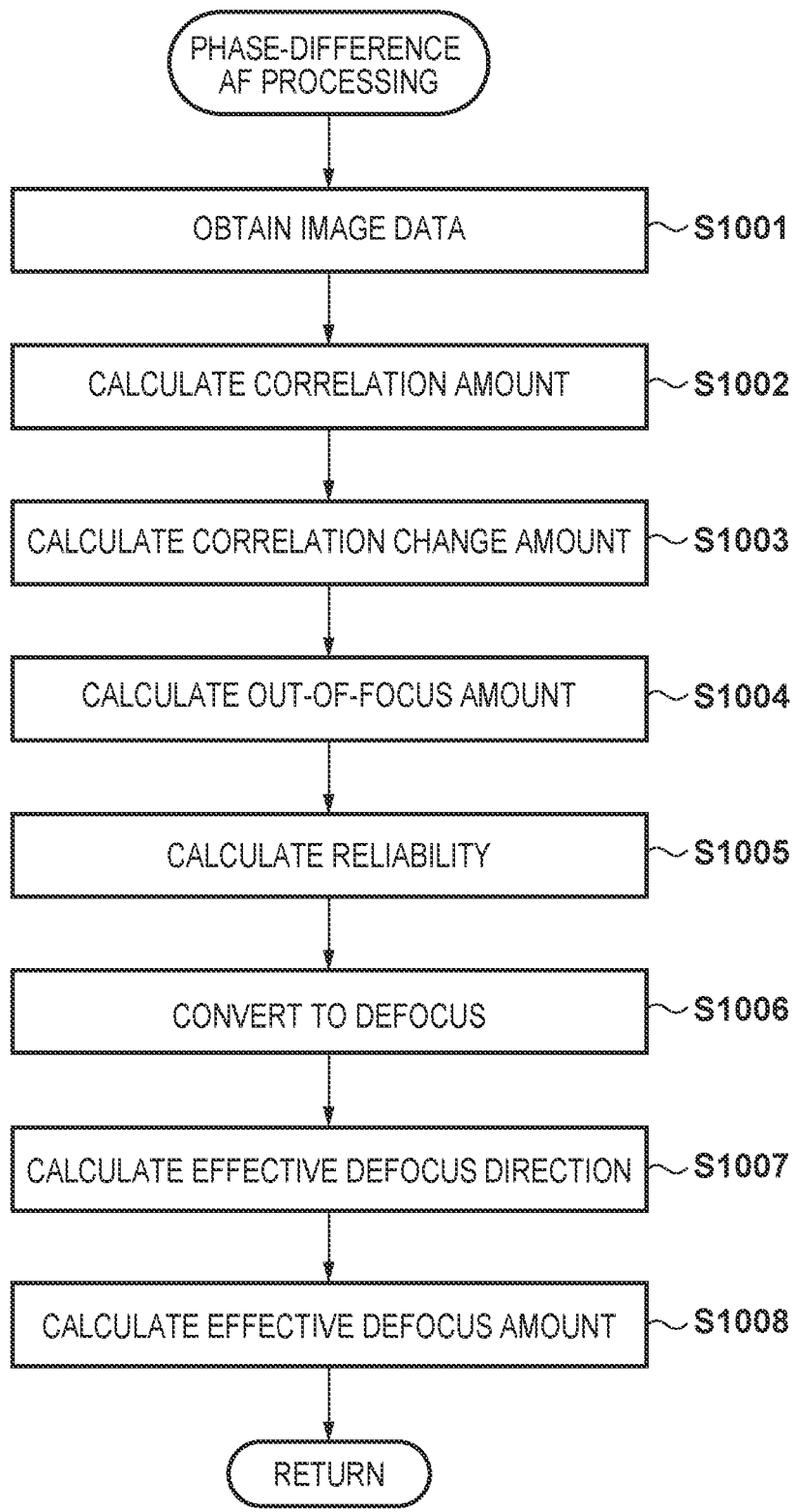
F I G. 12

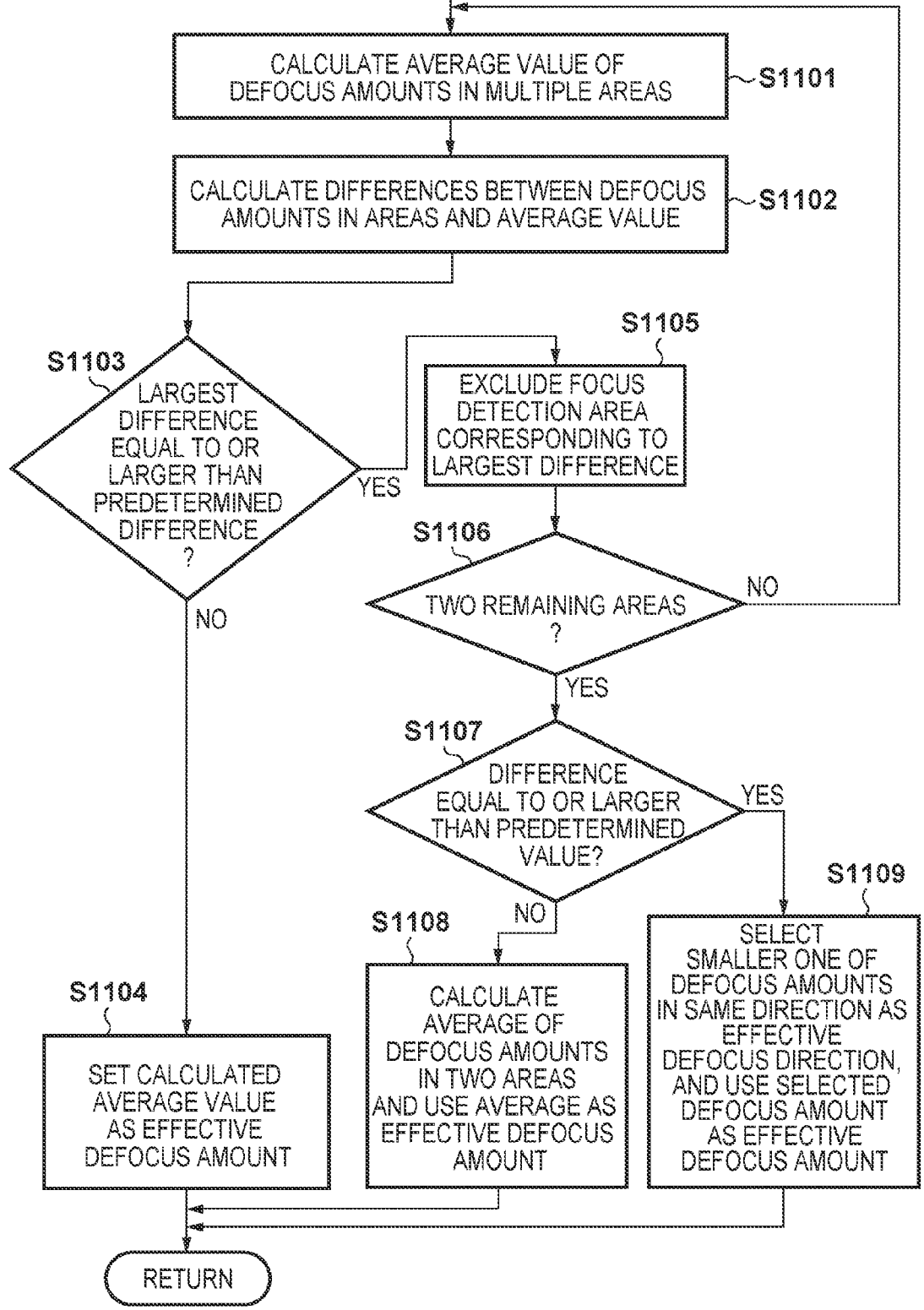

FOCUS CONTROL APPARATUS, METHOD THEREFOR, AND STORAGE MEDIUM

BACKGROUND OF THE INVENTION

Field of the Invention

The present invention relates to an autofocus control technique in an image capturing apparatus.

Description of the Related Art

Conventionally known focus control methods used in digital cameras and other image capturing apparatuses include a phase-difference detection method and a contrast detection method (see Japanese Patent Laid-Open No. 09-054242 and Japanese Patent Laid-Open No. 2001-004914). Another known method is an imaging surface phase-difference detection method that takes into consideration a live-view (LV) mode in which image capture is performed while displaying captured images on, for example, a rear monitor (see Japanese Patent Laid-Open No. 2001-083407).

However, even with the imaging surface phase-difference detection method that takes the live-view mode into consideration, it is necessary to perform more stable focus control in conformity with the live-view mode and moving image capture. Especially with the recent trend toward higher resolution, a user easily feels a sense of discomfort if a focus state changes unexpectedly while moving images are displayed on a display unit.

In the imaging surface phase-difference detection method, the stability of focus control during the live-view mode and moving image capture may be improved by increasing a focus detection range. An increase in the focus detection range leads to an increase in the number of subjects that can be captured, and can alleviate an unexpected movement of a focus lens caused by movement of a temporarily-captured subject to the outside of the focus detection range.

However, when there is a conflict between a far point and a near point of a subject, an increase in the focus detection range could possibly make it difficult to bring the intended subject into focus. In view of this, it is considered that dividing the focus detection range into a plurality of focus detection areas is effective. However, in the case of the imaging surface phase-difference detection method, a subject image expands when a subject is significantly out of focus. This casts significant influence on the divided focus detection areas, thereby making it difficult to obtain focus detection results. Furthermore, during image capture with low light intensity, especially the signal-to-noise ratio is easily lowered in the divided focus detection areas, thereby making it difficult to obtain desired focus detection results. The same goes for the case of a low-contrast subject.

To address these problems, Japanese Patent Laid-Open No. 2014-32214 suggests the following technique: a phase-difference detection area is divided into a plurality of areas in a direction perpendicular to a direction of phase-difference detection, and in each of the divided areas, signals detected by pixels arranged along the direction of phase-difference detection are merged in the direction perpendicular to the direction of phase-difference detection. By thus merging the detected signals for reduction of the influence of noise, and by thus limiting a range of merger, an average pattern is yielded after merger of pixel signals, and a decrease in the precision of focus detection can be prevented. However, in Japanese Patent Laid-Open No. 2014-32214, the detected signals are merged only in the direction perpendicular to the direction of phase-difference detection, and there is a possibility that appropriate detected signals are not always obtained through merger depending on the image capturing condition.

SUMMARY OF THE INVENTION

The present invention has been made in view of the foregoing problems, and realizes a stable focusing operation during moving image capture while enabling focus detection in a wide area on an imaging surface in focus control based on an imaging surface phase-difference detection method.

According to a first aspect of the present invention, there is provided a focus control apparatus, comprising: an area setting unit that sets a plurality of divided areas by dividing an area of an imaging surface in a first direction and in a second direction that is different from the first direction, the first direction corresponding to a direction in which a focus state is detected; a focus detection unit that detects first information related to the focus state on the basis of a pair of image signals output from each of the plurality of divided areas; a calculation unit that calculates defocus information on the basis of the first information; and a control unit that performs focus control on the basis of the calculated defocus information, wherein in a first mode in which the defocus information for the focus control is calculated by combining pieces of the first information detected in at least a part of the plurality of divided areas, the calculation unit causes the part of the plurality of divided areas, in which the pieces of the first information for calculating the defocus information are combined, to vary in accordance with pieces of the first information detected in the plurality of divided areas and with an image capturing state.

According to a second aspect of the present invention, there is provided a focus control method, comprising: setting a plurality of divided areas by dividing an area of an imaging surface in a first direction and in a second direction that is different from the first direction, the first direction corresponding to a direction in which a focus state is detected; detecting first information related to the focus state on the basis of a pair of image signals output from each of the plurality of divided areas; calculating defocus information on the basis of the first information; and performing focus control on the basis of the calculated defocus information, wherein in a first mode in which the defocus information for the focus control is calculated by combining pieces of the first information detected in at least a part of the plurality of divided areas, the calculating causes the part of the plurality of divided areas, in which the pieces of the first information for calculating the defocus information are combined, to vary in accordance with pieces of the first information detected in the plurality of divided areas and with an image capturing state.

According to a third aspect of the present invention, there is provided a computer-readable storage medium having stored therein a program for causing a computer to execute a focus control method, the method comprising: setting a plurality of divided areas by dividing an area of an imaging surface in a first direction and in a second direction that is different from the first direction, the first direction corresponding to a direction in which a focus state is detected; detecting first information related to the focus state on the basis of a pair of image signals output from each of the plurality of divided areas; calculating defocus information on the basis of the first information; and performing focus control on the basis of the calculated defocus information, wherein in a first mode in which the defocus information for the focus control is calculated by combining pieces of the first information detected in at least a part of the plurality of divided areas, the calculating causes the part of the plurality of divided areas, in which the pieces of the first information for calculating the defocus information are combined, to vary in accordance with pieces of the first information detected in the plurality of divided areas and with an image capturing state.

Further features of the present invention will become apparent from the following description of exemplary embodiments with reference to the attached drawings.

BRIEF DESCRIPTION OF THE DRAWINGS

FIG. 1 is a block diagram showing configurations of main components of a lens apparatus and an image capturing apparatus according to an embodiment of the present invention.

FIGS. 2A and 2B show a partial area of an image sensor.

FIGS. 5A to 5E show patterns of division of a focus detection range.

FIG. 12 is a flowchart of phase-difference AF processing.

FIG. 13 is a flowchart of calculation of an effective defocus amount.

DESCRIPTION OF THE EMBODIMENTS

Figure 3:
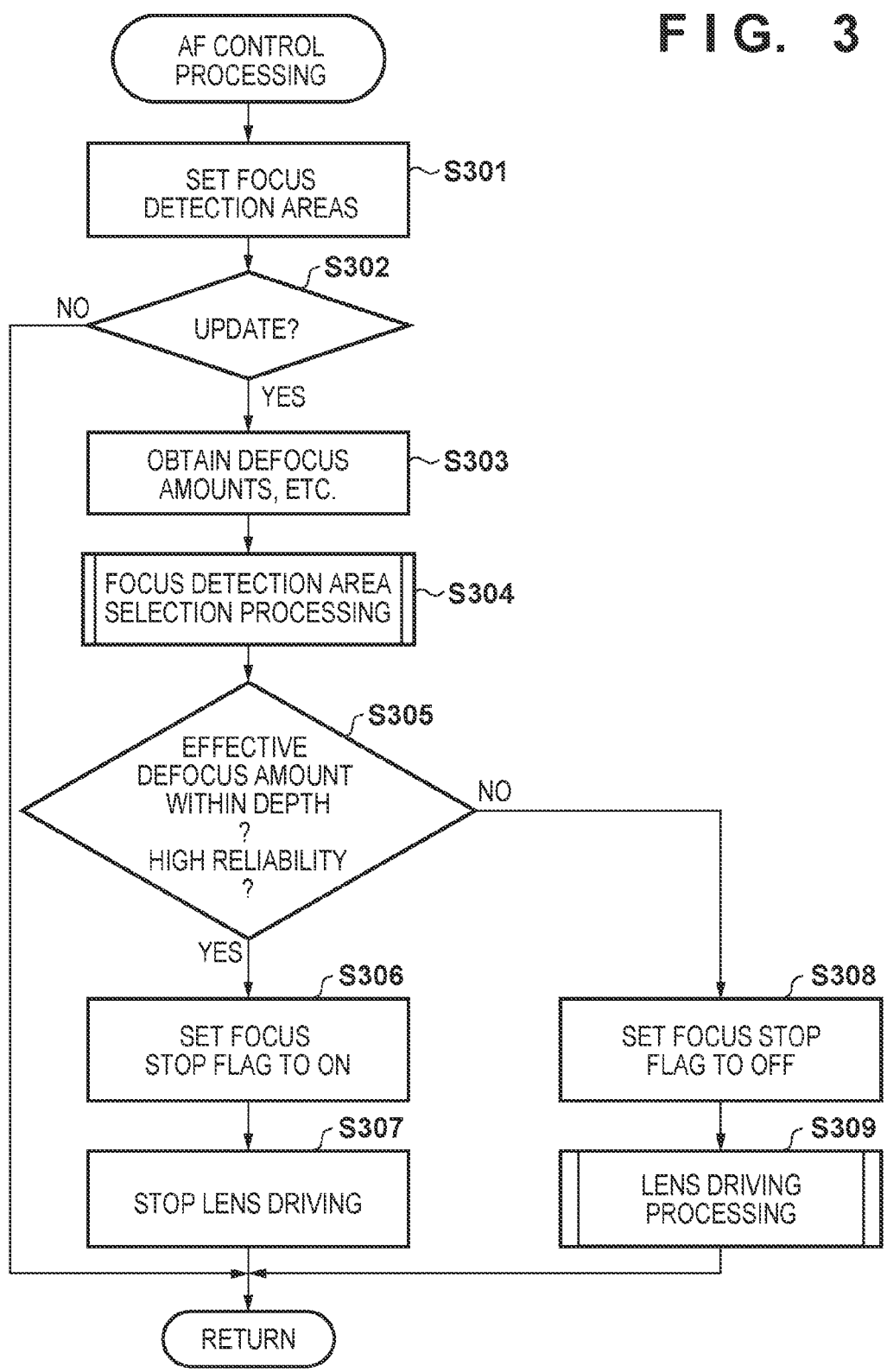
FIG. 3 is a flowchart showing AF control processing.

The following describes an embodiment of the present invention in detail with reference to the attached drawings. Note that the following embodiment is an example of means for embodying the present invention, should be modified or changed as appropriate depending on the configuration of an apparatus to which the present invention is applied and on various conditions, and does not limit the present invention.

<Configuration of Image Capturing Apparatus>

A description is now given of an image capturing apparatus provided with a focus control apparatus according to an embodiment of the present invention. Although the image capturing apparatus described in the present embodiment is configured in such a manner that a lens apparatus is attachable to and detachable from the image capturing apparatus, other image capturing apparatuses, such as a digital camera with a built-in lens, may be used.

FIG. 1 is a block diagram showing configurations of main components of a lens apparatus and an image capturing apparatus according to the present embodiment. As shown in FIG. 1, in the present embodiment, a lens apparatus 10 and an image capturing apparatus 20 are provided, and information communication is performed by a lens control unit 106 that achieves coordinated control over operations of the entire lens apparatus, and by a camera control unit 207 that coordinates operations of the entire image capturing apparatus.

First, a configuration of the lens apparatus 10 will be described. The lens apparatus 10 includes a fixed lens 101, a diaphragm 102, a focus lens 103, a diaphragm driving unit 104, a focus lens driving unit 105, the lens control unit 106, and a lens operation unit 107. An image capturing optical system is composed of the fixed first lens assembly 101, the diaphragm 102, and the focus lens 103.

The diaphragm 102 is driven by the diaphragm driving unit 104, and controls an amount of light incident on a later-described image sensor 201. The focus lens 103 is driven by the focus lens driving unit 105, and adjusts a focal point formed on the later-described image sensor 201. The diaphragm driving unit 104 and the focus lens driving unit 105 are controlled by the lens control unit 106, and determine the aperture of the diaphragm 102 and the position of the focus lens 103. When a user operation has been performed via the lens operation unit 107, the lens control unit 106 performs control corresponding to the user operation. The lens control unit 106 controls the diaphragm driving unit 104 and the focus lens driving unit 105 in accordance with a control instruction and control information received from the later-described camera control unit 207, and transmits lens control information to the camera control unit 207.

Next, a configuration of the image capturing apparatus 20 will be described. The image capturing apparatus 20 is capable of obtaining an image capturing signal from a beam of light that has passed through the image capturing optical system of the lens apparatus 10. It includes the image sensor 201, a CDS/AGC circuit 202, a camera signal processing unit 203, an AF signal processing unit 204, a display unit 205, a recording unit 206, the camera control unit 207, a camera operation unit 208, and a timing generator 209. The image sensor 201 is constituted by a CCD sensor, a CMOS sensor, or the like. A beam of light that has passed through the image capturing optical system of the lens apparatus forms an image on a light receiving surface of the image sensor 201, and then is converted by photodiodes into signal charges corresponding to an amount of incident light. On the basis of driving pulses that are fed from the timing generator 209 in accordance with a command from the camera control unit 207, the signal charges accumulated in the photodiodes are sequentially read out from the image sensor 201 as voltage signals corresponding to the signal charges.

A video signal and signals for AF that have been read out from the image sensor 201 are input to the CDS/AGC circuit 202 that performs sampling and gain adjustment; the video signal is output to the camera signal processing unit 203, and signals for imaging surface phase-difference AF are output to the AF signal processing unit 204. The camera signal processing unit 203 generates a video signal by applying various types of image processing to the signal output from the CDS/AGC circuit 202. The display unit 205 is composed of, for example, an LCD, and displays the video signal output from the camera signal processing unit 203 as a captured image. The recording unit 206 records the video signal from the camera signal processing unit 203 to a recording medium, such as a magnetic tape, an optical disc, and a semiconductor memory.

The AF signal processing unit 204 carries out correlation computation on the basis of two image signals for AF output from the CDS/AGC circuit 202. It also calculates correlation amounts (equivalent to later-described focus information), defocus amounts (equivalent to later-described second focus information), and reliability information (a degree of match between two images, a degree of steepness exhibited by two images, contrast information, saturation information, scratch information, and the like). Then, it outputs the calculated defocus amounts and reliability information to the camera control unit 207. On the basis of the obtained defocus amounts and reliability information, the camera control unit 207 notifies the AF signal processing unit 204 of a change in settings related to calculation of the same. The details of correlation computation will be described later with reference to FIGS. 9A to 11B.

The camera control unit 207 performs control through exchange of information within the entire camera 20. It executes not only processing within the camera 20, but also a wide variety of camera functions corresponding to user operations in response to input via the camera operation unit 208; examples of such camera functions include turning ON/OFF a power supply, changing settings, starting recording, starting AF control, and checking a recorded video. As stated earlier, it also exchanges information with the lens control unit 106 within the lens apparatus 10, transmits the control instruction and control information for the lens apparatus, and obtains information within the lens apparatus.

<Image Sensor>

FIGS. 2A and 2B show a part of the light receiving surface of the image sensor 201. In order to enable imaging surface phase-difference AF, the image sensor 201 includes an array of pixel units that are each provided with two photodiodes, that is to say, light receiving units, corresponding to one microlens. In this way, each pixel unit can receive a beam of light that has passed through a different one of divided areas of an exit pupil of the lens apparatus 10.

As reference, FIG. 2A is a schematic diagram showing a part of a surface of the image sensor with a Bayer array including red (R), blue (B), and green (Gb, Gr). FIG. 2B shows pixel units that are each provided with two photodiodes, that is to say, photoelectric conversion means, corresponding to one microlens; these pixel units correspond to the color filter array shown in FIG. 2A.

In the image sensor configured in the foregoing manner, each pixel unit can output two signals for phase-difference AF (hereinafter also referred to as A image signal and B image signal). Each pixel unit can also output an image capturing signal for recording, which is obtained by merging signals of the two photodiodes (A image signal+B image signal). Output of a signal obtained through such merger is equivalent to output from the image sensor with the Bayer array that is schematically shown in FIG. 2A. With the use of signals output from such an image sensor 201, the later-described AF signal processing unit 204 carries out correlation computation for two image signals, and calculates defocus amounts and various types of information, such as reliability.

Note that in the present embodiment, the image sensor 201 outputs a total of three signals: a signal for image capture, and two signals for phase-difference AF. However, the present invention is not limited to this method. For example, it may output a total of two signals: a signal for image capture, and one of two image signals for phase-difference AF. In this case, after the output, the other of the two image signals for phase-difference AF is calculated using two signals output from the image sensor 201.

FIGS. 2A and 2B show an example of an array of pixel units that are each provided with two photodiodes, that is to say, photoelectric conversion means, corresponding to one microlens. Alternatively, each pixel unit in the array may be provided with three or more photodiodes, that is to say, photoelectric conversion means, corresponding to one microlens. A plurality of pixel units may be provided in such a manner that the position of an aperture for a light receiving unit relative to a microlens varies among the pixel units. That is to say, it is sufficient to ultimately obtain two signals for phase-difference AF that enable phase-difference detection, such as an A image signal and a B image signal.

<AF Control Processing>

A description is now given of AF control processing executed by the camera control unit 207. FIG. 3 is a flowchart showing AF control processing executed by the camera control unit 207 shown in FIG. 1. The present processing is executed in accordance with a computer program stored in the camera control unit 207. For example, the present processing is executed at a readout cycle for an image capturing signal from the image sensor 201 for generating an image corresponding to one field (hereinafter also referred to as one frame or one screen) (in every vertical synchronization period). The present processing may be repeated multiple times within the vertical synchronization period (V rate).

Referring to FIG. 3, first, focus detection areas are set in step S301. As will be described later in detail, in the present embodiment, a plurality of focus detection areas are arranged at desired positions within an image capturing screen along a direction of phase-difference detection and along a direction perpendicular to the direction of phase-difference detection (area setting). For example, in a case where a focus detection range is set at the center of the image capturing screen as shown in FIG. 5A, nine focus detection areas 501 to 509 are arranged within the focus detection range as shown in FIG. 5B. They are referred to as first divided areas. The AF signal processing unit 204 calculates the results in the focus detection areas 501 to 509. The focus detection range is not limited to being arranged at the center of the image capturing screen, and may be arranged at any position on the image capturing screen.

Next, whether AF signals have been updated in the AF signal processing unit 204 is checked (step S302), and if the AF signals have been updated, the result of the update is obtained from the AF signal processing unit 204 (step S303). In step S304, focus detection area selection processing, which will be described later, is executed. Here, a later-described effective defocus amount is calculated from defocus amounts that are obtained from the focus detection areas and indicate out-of-focus amounts, and from reliability levels of the defocus amounts.

Next, it is determined whether the defocus amount calculated in step S304 is within a predetermined depth and has a reliability level higher than a predetermined level (a high reliability level), hence reliable (step S305). If the defocus amount is within the predetermined depth and its reliability is higher than the predetermined level, a focus stop flag is set to ON (step S306); if not, the focus stop flag is set to OFF (step S308). The focus stop flag in the ON state means that a point of focus has been reached through focus control, and thus focus control should be stopped.

Here, the reliability level of the defocus amount is high when the precision of the calculated defocus amount can be determined to be credible. When a defocus direction indicating a direction in which a point of focus is assumed to exist is credible, the reliability level is determined to be medium. For example, when the reliability level of the defocus amount is high, an A image signal and a B image signal have high contrast and have similar shapes (a level of match between two images is high), or a main subject image is already in focus. In this case, the defocus amount is reliable, and the focus lens is driven in accordance with the defocus amount.

When the reliability level of the defocus amount is medium, the level of match between two images calculated by the AF signal processing unit 204 is lower than a predetermined value, but the correlation obtained by relatively shifting the A image signal and the B image signal shows a certain tendency, and the defocus direction is reliable. This determination is often made when, for example, the main subject is slightly out of focus. The reliability level is determined to be low when neither the defocus amount nor the defocus direction is reliable. This determination is made when, for example, the A image signal and the B image signal have low contrast and the level of match between images is low. This determination is often made when the subject is significantly out of focus; when this determination is made, calculation of the defocus amount is difficult.

If the defocus amount is within the predetermined depth and its reliability is high, lens driving for focus control is stopped (step S307), and the processing proceeds to step S308. On the other hand, if the focus stop flag is set to OFF (step S308), later-described lens driving processing is executed (step S309), and the processing is ended.

<Lens Driving Processing>

Figure 4:
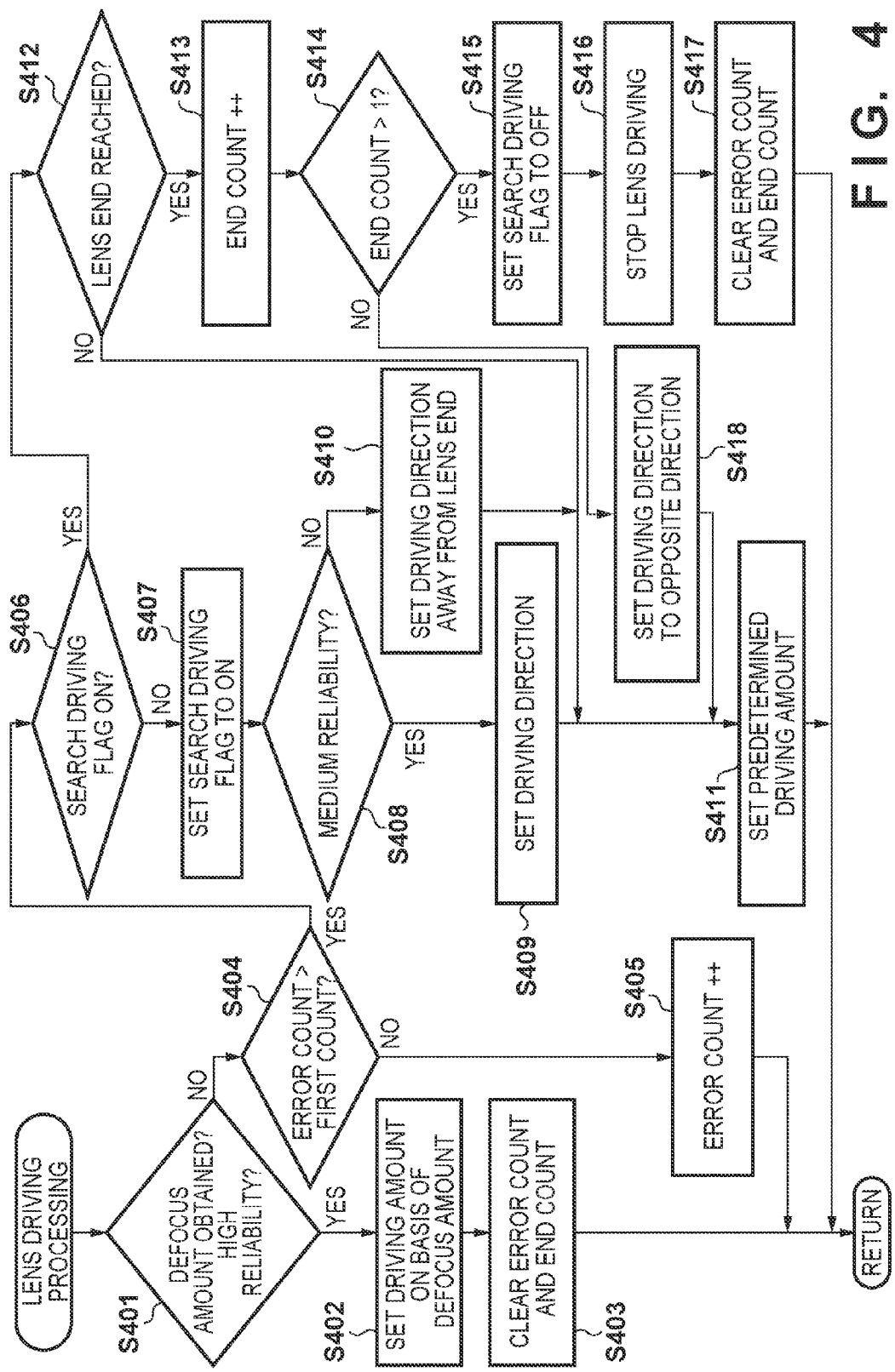
FIG. 4 is a flowchart showing lens driving processing.

FIG. 4 is a flowchart showing the details of the lens driving processing (step S309) shown in FIG. 3. First, in step S401, the camera control unit 207 determines whether the defocus amount has been obtained and its reliability level is high. If the defocus amount has been obtained and its reliability level is high (YES of step S401), a driving amount and a driving direction of the focus lens are determined on the basis of the defocus amount (step S402). Then, an error count and an end count are cleared (step S403), and the processing is ended.

If the defocus amount has not been obtained or its reliability level is not high in step S401 (NO of step S401), the camera control unit 207 determines whether the error count is larger than a first count (step S404). Although the first count is not shown, it is sufficient for the first count to be a value that has been preset and prestored to a nonvolatile memory. For example, it is sufficient for the first count to be a value that is equal to or larger than the double of a later-described second count.

If the error count is smaller than the first count in step S404 (NO of step S404), the error count is incremented (step S405), and the processing is ended. If the error count is larger than the first count (YES of step S404), the camera control unit 207 determines whether a search driving flag is ON (step S406).

If the search driving flag is OFF in step S406 (NO of step S406), a search operation has not been started yet, or the search is not currently conducted. Accordingly, the camera control unit 207 sets the search driving flag to ON (step S407), and determines whether the reliability level of the defocus amount is medium (step S408).

If the reliability is medium in step S408, the camera control unit 207 sets the driving direction in accordance with the defocus direction (step S409), and sets a predetermined driving amount (step S411). At this time, search driving is performed by driving the focus lens by the predetermined amount in the obtained defocus direction, rather than driving the focus lens on the basis of an absolute value of the defocus amount.

If the reliability is not medium in step S408 (NO of step S408), the camera control unit 207 sets the driving direction of the focus lens away from a lens end (step S410), and sets the predetermined driving amount (step S411). It is sufficient to use a preset value in the nonvolatile memory as the predetermined driving amount in step S411. For example, a distance that is several times larger than the depth of focus is used as the driving amount. Alternatively, the driving amount may vary in accordance with a focal length. For example, the larger the focal length, the larger the driving amount. Note that in this case, for example, any point on a search driving direction is farther from the lens end than from the current position of the focus lens.

If the search driving flag is ON (YES of step S406), search driving is already in execution. Therefore, the camera control unit 207 continuously performs previous focus control. Thereafter, the camera control unit 207 determines whether the lens end, which is a limit of lens driving for focus control, has been reached (step S412), and if the lens end has been reached (YES of step S412), increments the end count (step S413).

If the end count is larger than one (YES of step S414), it means that a credible defocus amount has not been obtained even by moving the focus lens from a near end to an infinity end. Thus, the camera control unit 207 determines that there is no subject that can be brought into focus, sets the search driving flag to OFF (step S415), and stops lens driving (step S416). Then, the error count and the end count are cleared (step S417), and the processing is ended. If the end count is not larger than one in step S414 (NO of step S414), the camera control unit 207 sets the lens driving direction for focus control to a direction opposite to the current driving direction (step S418), and sets the predetermined driving amount (step S411).

<Focus Detection Area Selection Processing>

FIGS. 5A to 5E show the details of focus detection areas within the image capturing screen, which are selected in the focus detection area selection processing (step S304) shown in FIG. 3. FIG. 5B shows the first divided areas. The focus detection range shown in FIG. 5A is divided into three areas in the direction of phase-difference detection, and further divided into three areas in the direction perpendicular to the direction of phase-difference detection. A later-described correlation amount (correlation degree) indicating a degree of correlation between two images is calculated from each area, and defocus amounts are calculated from the correlation amounts. Reliability levels of the defocus amounts are also calculated.

Normally, an in-focus state is achieved by calculating one effective defocus amount, which will be described later, from a combination of defocus amounts obtained from the first divided areas, and by performing lens driving as focus control accordingly. Hereinafter, the term "effective defocus amount" is used to indicate the concept of one defocus amount corresponding to a plurality of focus detection areas. By dividing the focus detection range into a plurality of areas in a horizontal direction and a direction at a right angle thereto, a conflict between a far point and a near point can be eliminated, and a subject image that is assumed to be targeted by a user can be brought into focus.

FIG. 5C shows second divided areas. Among the plurality of areas shown in FIG. 5B, areas along the direction of phase-difference detection are included in each of the second divided areas. That is to say, the areas 501 to 503 shown in FIG. 5B are included in an area 510 shown in FIG. 5C. Defocus amounts in the areas 510 to 512 shown in FIG. 5C are calculated as follows: in each area, correlation amounts in the included areas shown in FIG. 5B are merged into one correlation amount, and a defocus amount and its reliability level are calculated from the one correlation amount.

In the case of an imaging surface phase-difference detection method, the shape of a subject image that is desired to be captured varies significantly depending on the focus state (whether the subject image is significantly out of focus or is close to an in-focus state (slightly out of focus)).

Figure 6A:
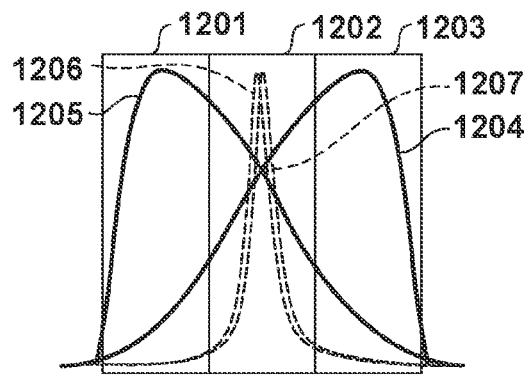
FIGS. 6A to 6E are conceptual diagrams showing correlation amounts in a state where a subject is out of focus.
Figure 6B:
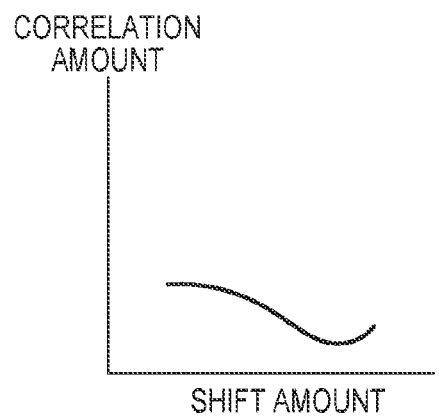
Figure 6C:
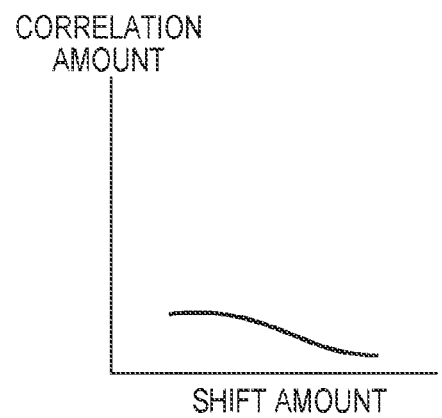
Figure 6D:
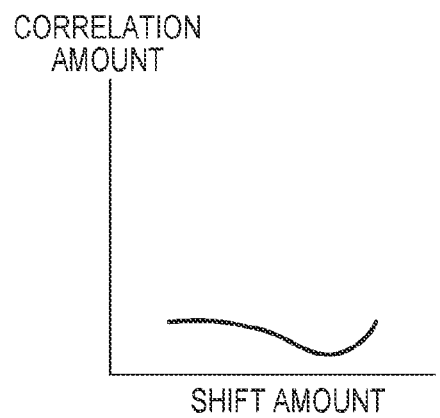
Figure 6E:
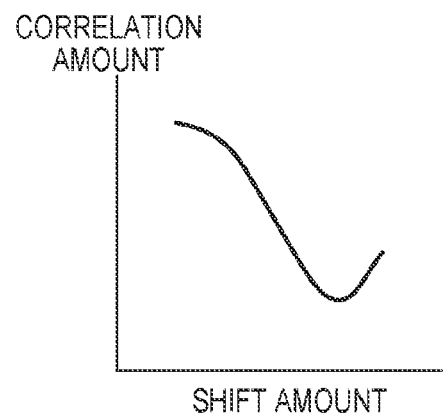

FIGS. 6A to 6E are conceptual diagrams showing a state in which a black subject having one vertical white line is significantly out of focus during image capture. In FIG. 6A, 1201 to 1203 represent focus detection areas that are equivalent to, for example, 501 to 503 shown in FIG. 5B. Also, 1204 and 1205 represent an A image signal and a B image signal, that is to say, phase-difference signals, of the subject image in the out-of-focus state, whereas 1206 and 1207 represent an A image and a B image of the subject image close to the in-focus state. FIGS. 6B, 6C, and 6D show correlation amounts in the areas 1201 to 1203; in each figure, a horizontal axis represents a shift amount, and a vertical axis represents a correlation amount. FIG. 6E shows a correlation amount obtained by merging the correlation amounts in the areas 1201 to 1203.

As shown in FIG. 6A, when the subject is out of focus, the A image signal and the B image signal have a shape of a gently-sloping mountain with a flaring foot, and extend across a plurality of focus detection areas. In this case, as shown in FIGS. 6B, 6C and 6D, there is little change in the correlation amount obtained by shifting the A image signal and the B image signal. Accordingly, the later-described steepness of the correlation amount decreases, thereby lowering the precision of defocus amounts and the reliability levels of the defocus amounts.

However, by merging the correlation amounts in areas along the direction of phase-difference detection, the steepness of the resultant correlation amount can be increased as shown in FIG. 6E. That is to say, merging the correlation amounts in areas along the direction of phase-difference detection makes it possible to capture the subject image over a wide range, improve the precision of defocus amounts when the subject is out of focus, and increase the reliability levels of the defocus amounts. Furthermore, as division is performed in the direction perpendicular to the direction of phase-difference detection, a conflict between a far point and a near point can be eliminated as well.

FIG. 5D shows third divided areas. Among the plurality of areas shown in FIG. 5B, areas along the direction perpendicular to the direction of phase-difference detection are included in each of the third divided areas. That is to say, the areas 501, 504, and 507 shown in FIG. 5B are included in an area 513 shown in FIG. 5D. Defocus amounts in the areas 513 to 515 shown in FIG. 5D are calculated as follows: in each area, correlation amounts in the included areas shown in FIG. 5B are merged into one correlation amount, and a defocus amount and its reliability level are calculated from the one correlation amount.

During image capture of a subject with low light intensity, levels of an A image signal and a B image signal are low. If the ISO film speed is increased in the image capture, more noise is included, and hence the signal-to-noise ratio is lowered. As a result, the precision of defocus amounts and the reliability levels of the defocus amounts are lowered.

Figure 7A:
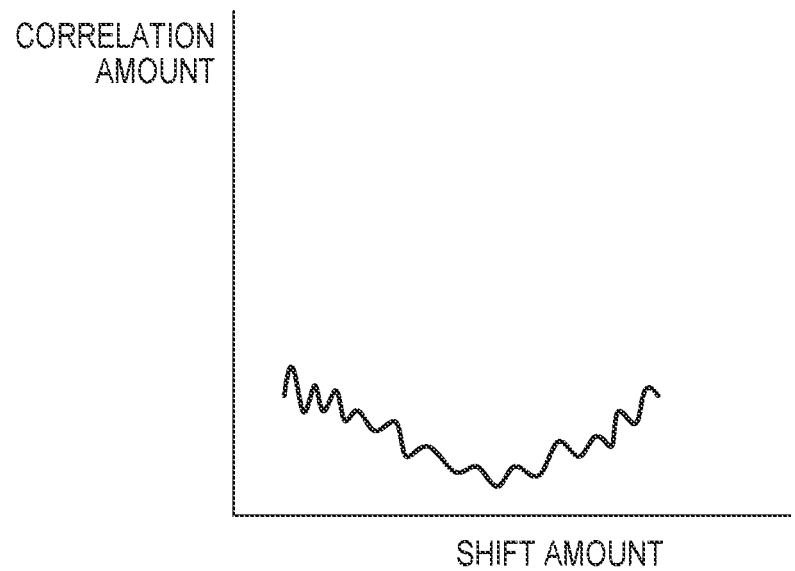
FIGS. 7A and 7B are conceptual diagrams showing correlation amounts during image capture with low light intensity.
Figure 7B:
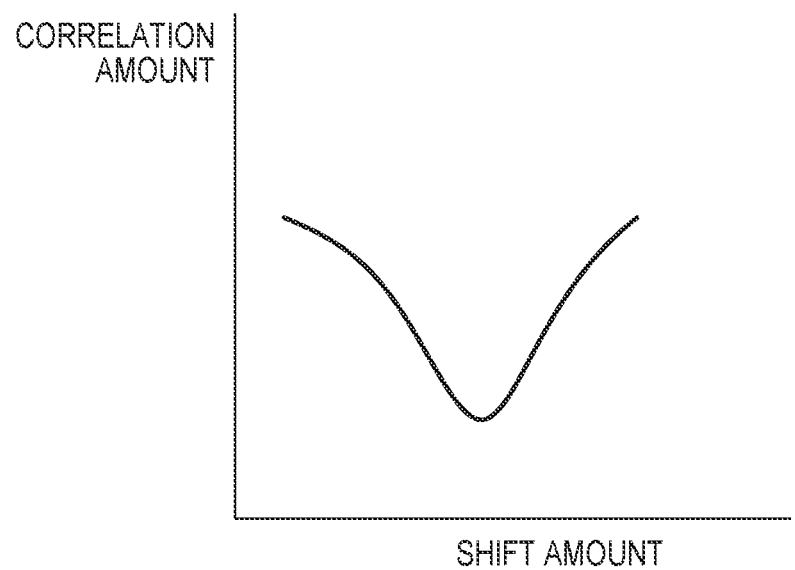

FIGS. 7A and 7B are conceptual diagrams showing a state of image capture of a black subject having one vertical white line with low light intensity. FIG. 7A shows a correlation amount in one area; in the figure, a horizontal axis represents a shift amount, and a vertical axis represents a correlation amount. FIG. 7B shows a correlation amount obtained by merging the correlation amount in one area shown in FIG. 7A with the correlation amounts in areas along the direction at a right angle to the direction of phase-difference detection. As shown in FIG. 7A, when image capture is performed with low light intensity, the signal-to-noise ratio is lowered, and thus the correlation amount fluctuates significantly. As a result, the steepness of the correlation amount decreases, and the precision of a defocus amount and the reliability level of the defocus amount are lowered.

However, as shown in FIG. 7B, merging the correlation amounts in areas along the direction perpendicular to the direction of phase-difference detection can improve the signal-to-noise ratio and increase the steepness of the resultant correlation amount. As a result, the precision of defocus amounts can be improved during image capture with low light intensity, and the reliability levels of the defocus amounts can be increased. Furthermore, as division is performed in a direction parallel to the direction of phase-difference detection, a conflict between a far point and a near point can be eliminated as well. The foregoing description applies not only to the case of low light intensity, but also to the case of a low-contrast subject, and the same effects can be achieved in the latter case.

FIG. 5E shows a fourth divided area. All of the plurality of areas shown in FIG. 5B, along the direction of phase-difference detection and the direction at a right angle thereto, are included in the fourth divided area. That is to say, the areas 501 to 509 shown in FIG. 5B are included in an area 516 shown in FIG. 5E. A defocus amount in the area 516 shown in FIG. 5E is calculated as follows: correlation amounts in the included areas shown in FIG. 5B are merged into one correlation amount, and a defocus amount and its reliability level are calculated from the one correlation amount.

In this case, although it is difficult to eliminate a conflict between a far point and a near point, the aforementioned effects of FIG. 5C and effects of FIG. 5D can both be achieved, the precision of the defocus amount can be improved, and the reliability level of the defocus amount can be increased, even if the following conditions are satisfied: light intensity is low, or a subject has low contrast; and the subject is in an out-of-focus state.

As described above, by changing a method of merging correlation amounts obtained from different areas depending on the condition of a subject and the image capturing condition, the precision of defocus amounts can be improved and their reliability levels can be increased. This facilitates capturing of a subject image, and makes it possible to stably bring the subject into focus.

Figure 8:
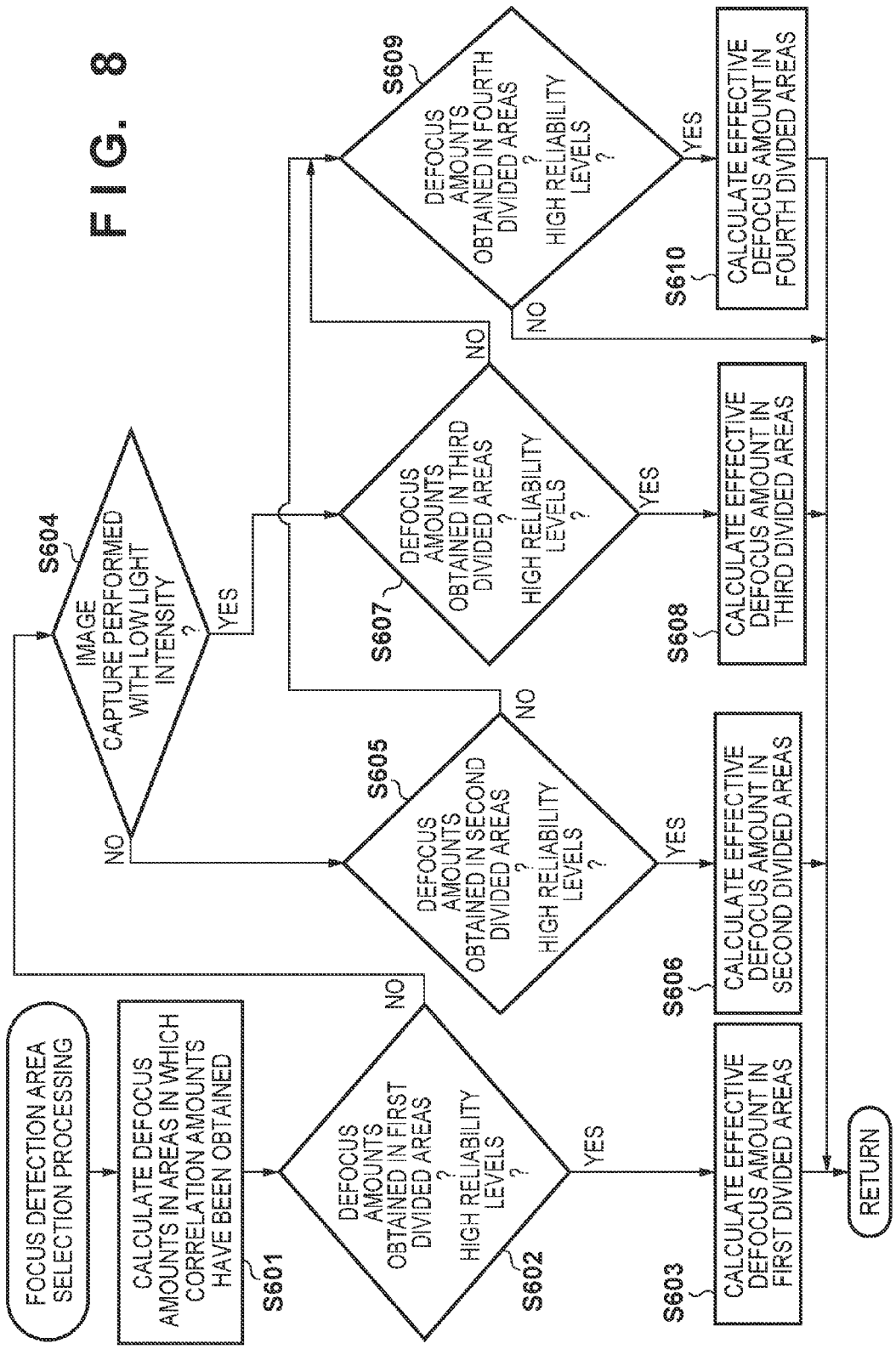
FIG. 8 is a flowchart showing focus detection area selection processing.

FIG. 8 is a flowchart showing the details of the focus detection area selection processing (step S304) shown in FIG. 3. First, in step S601, the camera control unit 207 calculates defocus amounts in areas in which correlation amounts have been obtained. Specifically, it calculates correlation amounts and defocus amounts in the first to fourth divided areas. It also calculates the reliability levels of the defocus amounts.

Next, it is determined whether the defocus amounts have been obtained in the first divided areas and their reliability levels are high (step S602). If the defocus amounts have been obtained in the first divided areas and their reliability levels are high (YES of step S602), the camera control unit 207 calculates a later-described effective defocus amount (step S603), and ends the processing. On the other hand, if the determination in step S602 results in NO, the processing moves to step S604.

In step S604, the camera control unit 207 determines whether image capture is performed with low light intensity (low light intensity determination). If the image capture is not performed with low light intensity (NO of step S604), it is determined whether the defocus amounts have been obtained in the second divided areas and their reliability levels are high (step S605). If the defocus amounts have been obtained in the second divided areas and their reliability levels are high (YES of step S605), the camera control unit 207 calculates an effective defocus amount from the results obtained in the second divided areas (step S606), and ends the processing. If the determination in step S605 results in NO, the processing moves to step S609.

If it is determined in step S604 that the image capture is performed with low light intensity (YES of step S604), the camera control unit 207 determines whether the defocus amounts have been obtained in the third divided areas and their reliability levels are high (step S607). If the defocus amounts have been obtained in the third divided areas and their reliability levels are high (YES of step S607), the camera control unit 207 calculates an effective defocus amount from the results obtained in the third divided areas (step S608), and ends the processing. On the other hand, if the determination in step S607 results in NO, the processing moves to step S609.

In step S609, the camera control unit 207 determines whether the defocus amount has been obtained in the fourth divided area and its reliability level is high. If the defocus amount has been obtained in the fourth divided area and its reliability level is high (YES of step S609), an effective defocus amount is calculated from the result obtained in the fourth divided area (step S610). On the other hand, if the determination in step S609 results in NO, the processing is ended.

In the present embodiment, in step S601, the defocus amounts are calculated from the correlation amounts in all divided areas, and the reliability levels of the defocus amounts are calculated; however, the present invention is not limited in this way. For example, in step S601, the correlation amounts and defocus amounts in the first divided areas may be calculated. Then, the reliability levels of the defocus amounts may be calculated. Thereafter, before step S605, the correlation amounts and defocus amounts in the second divided areas may be calculated, and the reliability levels of the defocus amounts may be calculated; that is to say, computations may be carried out in sequence.

Alternatively, computations may be carried out in multiple sequential batches while switching between determinations for the first to fourth divided areas. For example, determination for the first divided areas is made in the first field, and if the determination in step S602 results in NO, step S604 is executed in the second field, followed by determination for the second or third divided areas.

In this case, whether the image capture is performed with low light intensity may be determined in step S604 using a first determination method of determining whether the ISO film speed is equal to or larger than a predetermined value. If the ISO film speed is equal to or larger than the predetermined value, it is determined that the image capture is performed with low light intensity; if not, it is determined that the image capture is not performed with low light intensity. Alternatively, the determination may be made using a second determination method of determining whether a luminance peak value of a video signal is equal to or larger than a predetermined value. If the luminance peak value of the video signal is equal to or larger than the predetermined value, it is determined that the image capture is not performed with low light intensity; if not, it is determined that the image capture is performed with low light intensity. Alternatively, the determination may be made using a third determination method of determining whether an exposure value is equal to or smaller than a predetermined value. If the exposure value is equal to or smaller than the predetermined value, it is determined that the image capture is performed with low light intensity; if not, it is determined that the image capture is not performed with low light intensity. Alternatively, the determination may be made using a fourth determination method of determining whether a set gain is equal to or larger than a predetermined value. If a value of the set gain is equal to or larger than the predetermined value, it is determined that the image capture is performed with low light intensity; if not, it is determined that the image capture is not performed with low light intensity.

Here, it is sufficient to determine that the image capture is performed with low light intensity if a high possibility of the image capture with low light intensity can be determined, i.e., if at least one of the aforementioned conditions is satisfied, or if some or all of the aforementioned conditions are satisfied.

Furthermore, although whether the image capture is performed with low light intensity is determined in step S604, whether a subject has low contrast may be further determined (low contrast determination). If it is determined that the subject does not have low contrast (NO of step S604), it is determined whether the defocus amounts have been obtained in the second divided areas and their reliability levels are high (step S605). If the defocus amounts have been obtained in the second divided areas and their reliability levels are high (YES of step S605), an effective defocus amount is calculated from the results obtained in the second divided areas (step S606), and the processing is ended. If the determination in step S605 results in NO, the processing moves to step S609.

If the subject is determined to have low contrast in step S604 (YES of step S604), it is determined whether the defocus amounts have been obtained in the third divided areas and their reliability levels are high (step S607). If the defocus amounts have been obtained in the third divided areas and their reliability levels are high (YES of step S607), an effective defocus amount is calculated from the results obtained in the third divided areas (step S608), and the processing is ended. On the other hand, if the determination in step S607 results in NO, the processing moves to step S609.

This is because, in the case of image capture of a low-contrast subject, correlation amounts are not likely to exhibit steepness, and the precision of defocus amounts is easily lowered, similarly to the case of low light intensity. Furthermore, a low-contrast subject is susceptible to luminance variations (shading) caused by lens aberration. The influence of shading increases especially as an image height increases. Such shading cannot always be corrected thoroughly, even if processing for correcting shading is executed. Should a part of shading be left uncorrected, a subject image is deformed due to a change in the levels of image signals in some pixels, and the precision of focus detection is lowered. In particular, if the levels of image signals of the subject image are low, the subject image is susceptible to uncorrected shading as the influence of uncorrected shading is noticeable in the levels of image signals, thereby giving rise to a higher possibility of error. In view of this, correlation amounts in the third divided areas are merged; in this way, correlation amounts exhibiting steepness are easily obtained, and the precision of defocus amounts and their reliability levels can be improved.

Here, whether the subject has low contrast may be determined on the basis of first determination of whether a difference between the largest value and the smallest value of an A image signal and a B image signal is equal to or smaller than a predetermined value. If the difference between the largest value and the smallest value of the A image signal and the B image signal is equal to or smaller than the predetermined value, it is determined that the subject of image capture has low contrast; if not, it is determined that the subject of image capture does not have low contrast. Alternatively, whether the subject has low contrast may be determined on the basis of second determination of whether a difference between the largest value and the smallest value of luminance levels of the video signal is equal to or smaller than a predetermined value. If the difference between the largest value and the smallest value of the luminance levels of the video signal is equal to or smaller than the predetermined value, it is determined that the subject of image capture has low contrast; if not, it is determined that the subject of image capture does not have low contrast.

Here, it is sufficient to determine that the subject of image capture has low contrast if a high possibility of image capture of a low-contrast subject can be determined, i.e., if at least one of the aforementioned conditions is satisfied, or if all of the aforementioned conditions are satisfied.

In the present embodiment, in merging the correlation amounts in areas along the direction perpendicular to the direction of phase-difference detection, the correlation amounts in all of the areas included in the focus detection range are merged; however, the present invention is not limited in this way. The following configuration may be adopted: in an arbitrary area, the correlation amounts in the included areas arranged along the direction perpendicular to the direction of phase-difference detection are compared with one another, and only the correlation amounts in areas in which shift amounts corresponding to local minima of the correlation amounts are equal to or smaller than a predetermined value are merged. For example, in the case of 514 shown in FIG. 5D in which the correlation amounts in the areas 502, 505, and 508 are merged, if a shift amount corresponding to a local minimum of the correlation amount in 508 is different by at least a predetermined shift amount from shift amounts corresponding to local minima of the correlation amounts in 502 and 505, then only the correlation amounts in 502 and 505 are merged.

The same goes for a method in which conversion into defocus amounts is performed on the basis of local minima of correlation amounts in the areas, and then merger is performed only in areas in which the defocus amounts fall within a predetermined range.

It is sufficient to set the aforementioned predetermined shift amount or predetermined range as a ratio to the depth of focus, e.g., convert the predetermined shift amount or the predetermined range into a shift amount or a defocus amount that is twice as large as the depth of focus.

In this case, the predetermined shift amount or the predetermined range is set to be larger when image capture is performed with low light intensity than when image capture is not performed with low light intensity. For example, when it is determined that image capture is performed with low light intensity, the predetermined shift amount or the predetermined range is converted into a shift amount or a defocus amount that is four times as large as the depth of focus.

The foregoing description applies not only to a case in which it is determined that image capture is performed with low light intensity, but also to a case in which a subject is determined to have low contrast. In this way, a conflict between a far point and a near point can be eliminated. It will be assumed that the correlation amounts in at least two areas are merged.

<Correlation Computation>

Below is a description of computation of correlation as correlation information, correlation amount waveforms, and the like, followed by a description of a method of calculating the aforementioned effective defocus amount.

Figure 9A:
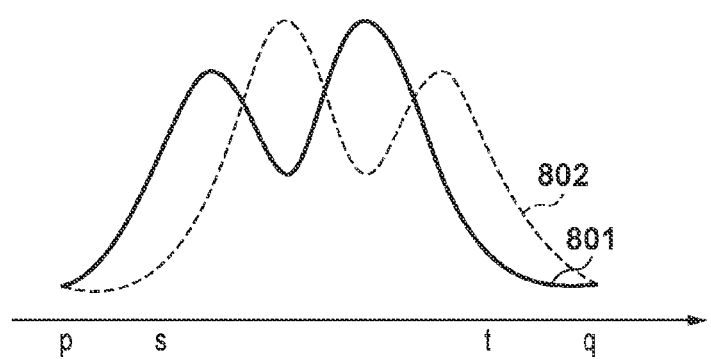
FIGS. 9A to 9D show image signals obtained from a detection area targeted for detection of a defocus amount.
Figure 9B:
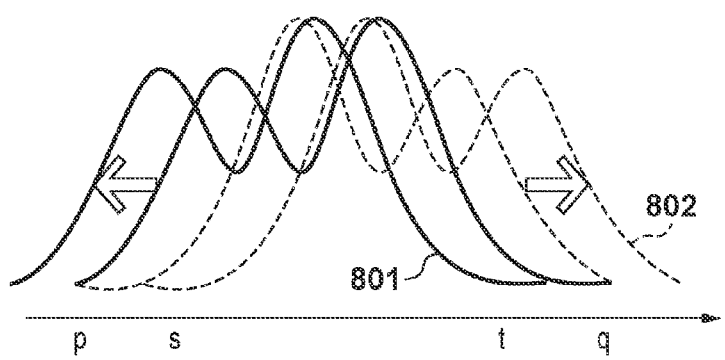
Figure 9C:
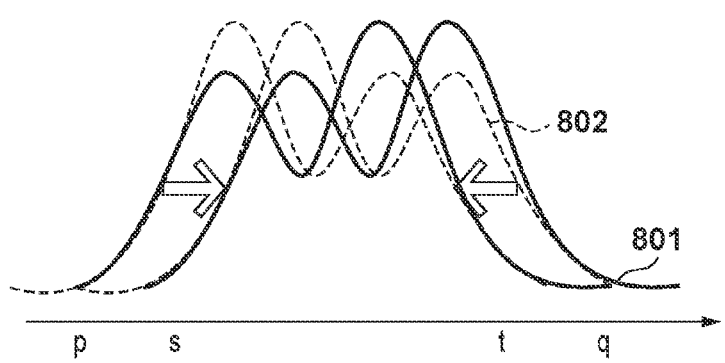
Figure 9D:
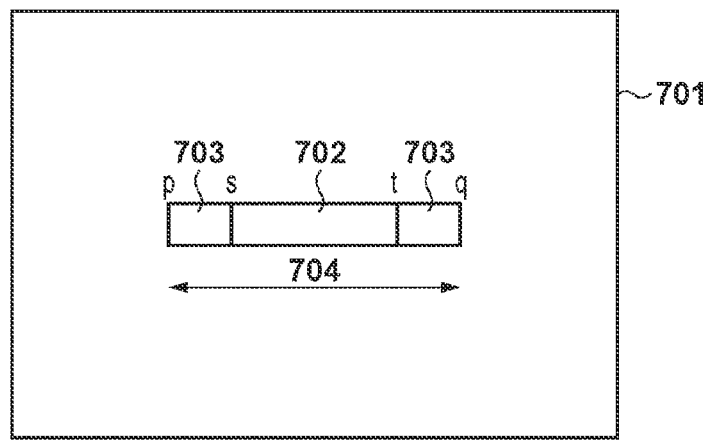

FIG. 9D is a conceptual diagram showing examples of areas from which image signals are obtained, the areas being included in a pixel array in the image sensor 201. In a pixel array 701 in which pixel units are arrayed, an area 702 serves as a target of computation described below. A shift area 704 necessary for correlation computation is obtained by combining the area 702 with shift areas 703 that are necessary for correlation computation for calculation of a defocus amount in the area 702.

In FIGS. 9A to 9D, 10A, 10B, 11A, and 11B, p, q, s, and t represent coordinates along an x-axis direction, a section from p to q represents the shift area 704, and a section from s to t represents the area 702.

FIGS. 9A, 9B, and 9C show image signals obtained from the shift area 704 that is set as shown in FIG. 9D. Referring to the image signals, a section from s to t corresponds to the area 702, and a section from p to q corresponds to the shift area 704, which is a range necessary for calculation of a defocus amount based on a shift amount. FIG. 9A is a conceptual diagram showing waveforms of a pre-shift A image signal and B image signal for correlation computation. A solid line 801 represents the A image signal, and a dash line 802 represents the B image signal. FIG. 9B is a conceptual diagram showing image waveforms obtained by shifting the pre-shift image waveforms shown in FIG. 9A in a positive direction, and FIG. 9C is a conceptual diagram showing image waveforms obtained by shifting the pre-shift image waveforms shown in FIG. 9A in a negative direction. A correlation amount indicating a degree of correlation between two images is calculated by, for example, shifting the A image signal 801 and the B image signal 802 bit by bit in the directions of arrows.

A description is now given of a method of calculating a correlation amount COR. First, for example, the A image signal and the B image signal are shifted bit by bit as shown in FIGS. 9B and 9C, and a sum of absolute values of differences between the shifted A image signal and B image signal is obtained as the correlation amount COR. A shift amount is expressed as i, the smallest shift amount is p−s shown in FIG. 10A, and the largest shift amount is q−t shown in FIG. 10A. In addition, x represents the coordinates at which a focus detection area starts, and y represents the coordinates at which the focus detection area ends. Using the foregoing elements, the correlation amount COR is given by the following Expression 1.

$$COR[i] = \sum_{k=x}^{y} |A[k+i] - B[k-i]|\{(p-s) < i < (q-t)\}$$

Expression 1

Figure 10A:
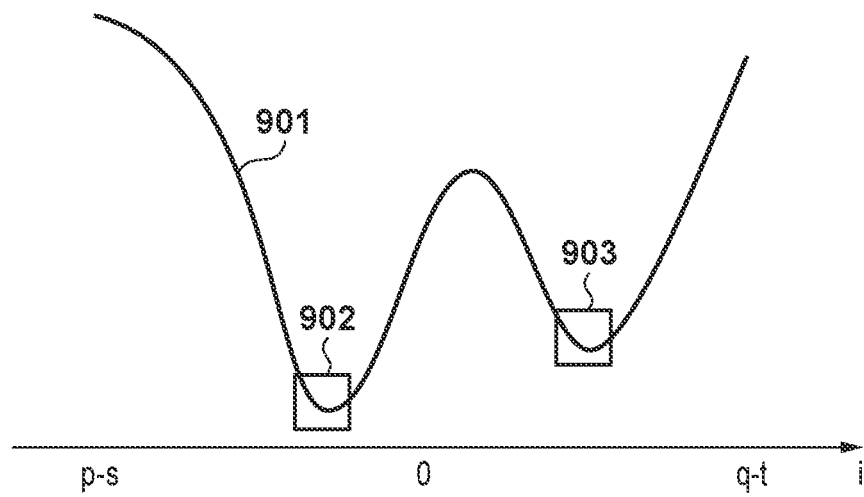
FIGS. 10A and 10B show a correlation amount waveform, a correlation change amount waveform, and an out-of-focus amount.

FIG. 10A is a conceptual diagram showing a waveform of the correlation amount COR as a graph. In the graph, a horizontal axis represents a shift amount, and a vertical axis represents the correlation amount COR. The graph pertains to an example in which a correlation amount waveform 901 has extrema 902, 903. A smaller one of the extrema of the correlation amount indicates a higher degree of match between an A image and a B image.

A description is now given of a method of calculating a correlation change amount ΔCOR. First, using the conceptual diagram of FIG. 10A showing the correlation amount waveform, a correlation change amount ΔCOR is calculated on the basis of, for example, changes in the correlation amount COR at an interval corresponding to one shift. A shift amount is expressed as i, the smallest shift amount is p–s shown in FIG. 10A, and the largest shift amount is q–t shown in FIG. 10A. Using the foregoing elements, ΔCOR is given by the following Expression 2.

$$\Delta COR[i]=COR[i-1]-COR[i+1]\{(p-s+1)<i<(q-t-1)\} \quad \text{Expression 2}$$

Figure 10B:
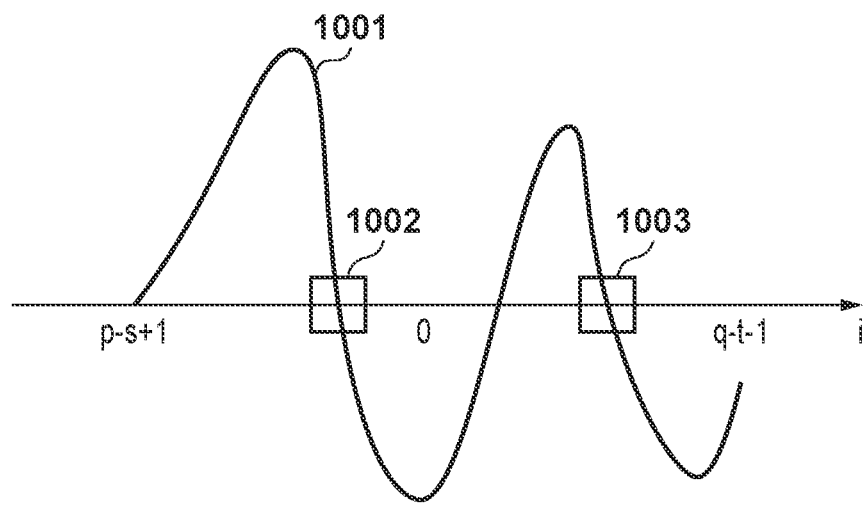

FIG. 10B is a conceptual diagram showing a waveform of the correlation change amount ΔCOR as a graph. In the graph, a horizontal axis represents a shift amount, and a vertical axis represents the correlation change amount. A correlation change amount waveform 1001 has points 1002, 1003 at which the sign of the correlation change amount changes from positive to negative. From the point 1002, at which the correlation change amount ΔCOR hits zero, obtainment of a shift amount of the A image signal and the B image signal that relatively increases the degree of match between the A image and the B image is possible. This shift amount corresponds to a defocus amount.

Figure 11A:
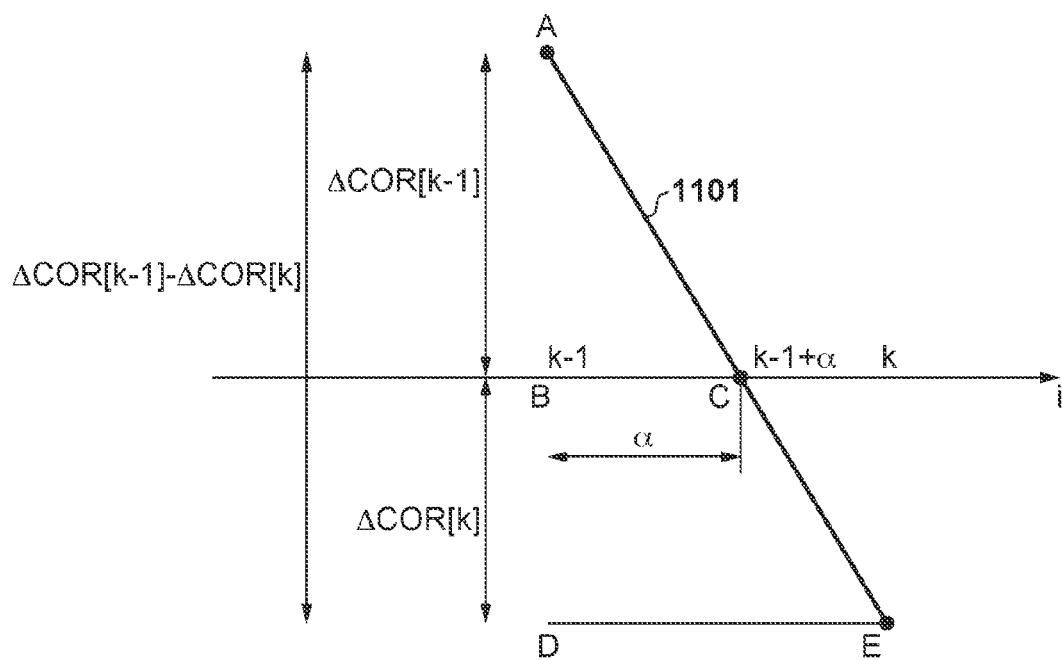
FIGS. 11A and 11B show a method of calculating a degree of match between two images.

FIG. 11A is an enlarged view of the point 1002 shown in FIG. 10B, and shows a part of the waveform 1001 of the correlation change amount ΔCOR as a waveform 1101. With reference to FIG. 11A, the following describes a method of calculating an out-of-focus amount PRD corresponding to a defocus amount. Assume that the out-of-focus amount is divided into an integer part β and a decimal part α. The decimal part α can be calculated on the basis of a similarity relationship between a triangle ABC and a triangle ADE in the figure, using the following Expression 3.

$$AB:AD = BC:DE \quad \text{Expression 3}$$
$$\Delta COR[k-1]:\Delta COR[k-1] - \Delta COR[k] =$$
$$\alpha:k - (k-1)$$
$$\alpha = \frac{\Delta COR[k-1]}{\Delta COR[k-1] - \Delta COR[k]}$$

On the other hand, the integer part β can be calculated on the basis of FIG. 11A using the following Expression 4.

$$\beta = k - 1 \quad \text{Expression 4}$$

A sum of α and β described above is the out-of-focus amount PRD.

When there are multiple zero-crossings as shown in FIG. 10B, a zero-crossing exhibiting significant steepness, maxder, in the changing correlation amount is regarded as a first zero-crossing. The steepness is an index showing how easily AF is performed; the larger the value of the steepness is, the more easily AF is performed. The steepness is given by the following expression 5.

$$\text{max}der=|\Delta COR[k-1]|+|\Delta COR[k]| \quad \text{Expression 5}$$

As described above, when there are multiple zero-crossings, a first zero-crossing is determined on the basis of the steepness.

Figure 11B:
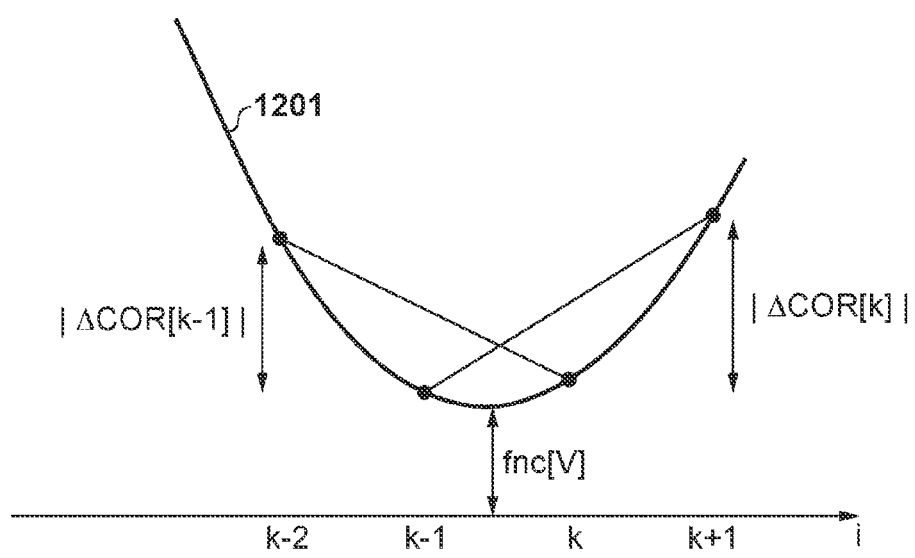

A description is now given of a method of calculating a reliability level of the out-of-focus amount. This corresponds to reliability of a defocus amount; the following description is one example, and the reliability level may be calculated using other known methods. Reliability can be defined by the aforementioned steepness and a degree of match, fnclvl, between two image signals, i.e., an A image signal and a B image signal (hereinafter referred to as a degree of match between two images). The degree of match between two images is an index showing the precision of the out-of-focus amount; the smaller the value of the degree of match between two images, the higher the precision. FIG. 11B is an enlarged view of the vicinity of the extremum 902 shown in FIG. 10A, and shows a part of the correlation amount waveform 901 as a waveform 1201. The degree of match between two images is calculated on the basis of this figure. The degree of match between two images is given by the following Expression 6.

(i) when$|\Delta COR[k-1]|\times 2 <$ max$der, fnclvl = COR[k-1] + \Delta COR[k-1]/4$ (ii) when$|\Delta COR[k-1]|\times 2 >$ max$der, fnclvl = COR[k] - \Delta COR[k]/4$ Expression 6

This concludes the description of calculation of the degree of match between two images.

<Calculation of Defocus Amount>

FIG. 12 is a flowchart of processing ending with calculation of a defocus amount. Note that in the following exemplary description, an out-of-focus amount and a defocus amount will be distinguished from each other. A defocus amount according to a technical idea of the present embodiment may be an absolute distance from a point of focus, the number of pulses, or a (relative) value of a different level/ unit. The defocus amount is a value that indicates whether determination of the extent of deviation from an in-focus state is possible, and whether determination of the extent of focus control that should be performed to make a transition to the in-focus state is possible. Obtainment of defocus information within the foregoing concept is referred to as obtainment of focus information.

In step S1001, an A image signal and a B image signal are obtained from pixels in each of areas that are set as shown in FIGS. 5A to 5E. Next, a correlation amount is calculated from the obtained image signals (step S1002). Subsequently, a correlation change amount is calculated from the calculated correlation amount (step S1003). Then, an out-of-focus amount is calculated from the calculated correlation change amount (step S1004). Furthermore, a reliability level, which indicates how reliable the calculated out-of-focus amount is, is calculated (step S1005). The foregoing processes are executed in each one of the areas within the focus detection range.

Then, in each one of the areas within the focus detection range, the out-of-focus amount is converted into a defocus amount (step S1006). Furthermore, an effective defocus direction and an effective defocus amount are calculated (steps S1007, S1008).

<Calculation of Effective Defocus Amount>

FIG. 13 is a flowchart of processing for calculating one defocus amount corresponding to the focus detection range as the effective defocus amount shown in the aforementioned step S1008. In the present embodiment, processing is executed using a defocus amount; alternatively, processing may be executed using a shift amount corresponding to a local minimum of a correlation amount. That is to say, as stated earlier, either of them may be used as long as it, in concept, indicates whether it is possible to determine the extent of deviation from an in-focus state, and whether it is possible to determine the extent of focus control that should be performed to make a transition to the in-focus state.

First, the camera control unit 207 searches the plurality of areas within the focus detection range for areas in which defocus amounts have been obtained and their reliability levels are high. It calculates an average value of the defocus amounts in the areas that have been found to satisfy the conditions as a result of the search (step S1101).

Next, the camera control unit 207 calculates differences between the defocus amounts in the areas and the average value calculated in step S1101 (step S1102). Then, it is determined whether the largest one of the calculated differences in the areas is equal to or larger than a predetermined difference. That is to say, it is determined whether the defocus amount corresponding to the largest difference exhibits a large deviation among the defocus amounts in the plurality of areas within the focus detection range. If the largest one of the calculated differences in the areas is smaller than the predetermined difference (NO of step S1103), the camera control unit 207 sets the average value calculated in step S1101 as the effective defocus amount (step S1104). On the other hand, if the largest one of the calculated differences in the areas is equal to or larger than the predetermined difference (YES of step S1103), the defocus amount in the area corresponding to the largest difference is excluded from the operands used in calculation of the average value (step S1105). That is to say, among the defocus amounts in the plurality of areas within the focus detection range, a defocus amount exhibiting a large deviation is excluded from the operands.

In step S1106, the camera control unit 207 determines whether there are defocus amounts in the remaining areas; if there are defocus amounts in the remaining areas (NO of step S1106), it proceeds to step S1101 again and repeats the processing. If the number of the defocus amounts in the remaining areas is two (YES of step S1106), it proceeds to step S1107 and determines whether a difference between the defocus amounts in the remaining two areas is equal to or larger than the predetermined difference (step S1107).

If the difference between the defocus amounts is equal to or larger than the predetermined difference (YES of step S1107), the camera control unit 207 selects a smaller one of defocus amounts that are in the same direction as the effective defocus direction, and uses the selected defocus amount as the effective defocus amount in step S1109. If not, the camera control unit 207 calculates an average of the two defocus amounts and uses the average as the effective defocus amount (step S1108).

In a case where only one area has been set, one defocus amount that has been obtained is used as the effective defocus amount. In a case where no area yields a defocus amount with a high reliability level, no effective defocus amount is set. The foregoing description applies not only to the effective defocus amount, but also to the effective defocus direction. Furthermore, for example, areas in which the defocus amounts have been obtained and their reliability levels are high or medium are searched for from among the plurality of areas, and a direction that appears most frequently among the directions in the discovered areas is used as the effective defocus direction.

In the foregoing description, the defocus amount in the area that yields the largest difference is considered a defocus amount exhibiting a large deviation, and is excluded from the operands used in calculation of the average value (step S1105). However, certain effects can be achieved by reducing a weight for the defocus amount exhibiting a large deviation, instead of excluding such a defocus amount from the operands. In this case, there is a possibility that the main subject image is defocused by an amount corresponding to the weight.

As described above, among the defocus amounts in the plurality of areas within the focus detection range, a defocus amount exhibiting a large deviation is not used. This is because, as one defocus amount corresponding to the focus detection range is calculated from the defocus amounts in the plurality of areas, there is a relatively high possibility of the occurrence of a so-called conflict between a far point and a near point depending on the size of the focus detection range.

In the foregoing description, averaging processing is used as an example of a method of obtaining one piece of defocus information corresponding to the focus detection range using a plurality of pieces of focus information output in the focus detection range. Alternatively, the defocus amount may be calculated by applying predetermined weighting instead of the averaging processing. As described above, one piece of defocus information corresponding to the focus detection range is obtained using the plurality of output pieces of defocus information, and such obtainment is carried out for the following reason. If a defocus amount in one area is selected from among the defocus amounts in the areas within the focus detection range, the subject image is captured as a "line" or "point". As a result, focus control is performed also with respect to a difference between defocus amounts in areas in which the subject image is captured as a "line" or "point", thereby increasing the possibility that the resultant live-view images and moving images are not in an appropriate form. On the other hand, the technical idea of averaging the defocus amounts in the areas enables the subject image to be captured as a "plane", thereby alleviating the negative effects of focus control based on a difference between defocus amounts in areas in which the subject image is captured as a "line" or "point". This technical idea also secures the precision at which a subject image targeted by the user is brought into focus, as stated earlier. The same goes for a case in which one piece of defocus information corresponding to the areas is obtained using a plurality of pieces of focus information that have been output under the influence of weighting, instead of using the averaging processing.

As described above, by averaging a plurality of defocus amounts in the areas arranged for a subject image that should be captured as one entity, stable focus control can be achieved while suppressing a fluctuation in a defocus amount in each area within the focus detection range.

Furthermore, the predetermined difference in steps S1103 and S1107 may be changed depending on whether the image capturing state of a subject indicates low light intensity. In the case of image capture with low light intensity, the ISO film speed may be increased in the image capture, and a subject image may have low contrast. As a result, the signal-to-noise ratio of an A image signal and a B image signal may be lowered, correlation amounts may not be likely to exhibit steepness, a fluctuation in defocus amounts may increase, and the precision may be lowered. Thus, if a threshold equivalent to a threshold for normal image capture is used, the possibility of containment within the range decreases. For this reason, whether the image capture is performed with low light intensity is determined as stated earlier, and when the image capture is performed with low light intensity, the value of the predetermined difference is made larger than when the image capture is performed not with low light intensity.

Similarly, the predetermined difference may vary depending on whether the correlation amounts in the plurality of areas have been merged, that is to say, between the case of the first divided areas and other cases. To be more specific, in the case of divided areas other than the first divided areas, the value of the predetermined difference is made larger than in the case of the first divided areas. The correlation amounts in the plurality of areas are merged when the precision is low because the following conditions are satisfied: the defocus amounts are low in reliability; and image capture is performed with low light intensity, or a subject has low contrast. In view of this, if a threshold that is equivalent to a threshold for a case in which the correlation amounts in the plurality of areas are not merged is used, the possibility of containment within the range decreases, and hence capturing of a subject and stabilization of focus control are expected to be difficult. The aforementioned method makes it possible to capture a subject, maintain the precision of defocus amounts, and stabilize focus control regardless of the image capturing state of the subject.

As described above, the embodiment of the present invention uses an imaging surface phase-difference AF method in which focus detection areas are arranged by dividing a focus detection range of an image capturing screen in a direction of phase-difference detection and in a direction at a right angle thereto. In accordance with the result of focus detection and the image capturing state of a subject, a method of merging correlation amounts in the plurality of areas is changed. This makes it possible to realize focus control that is more stable and more appropriate for a live-view mode and moving image capture than focus control of conventional image capturing apparatuses.

Although the present invention has been elaborated thus far on the basis of a preferred embodiment thereof, the present invention is not limited to such a specific embodiment and encompasses various embodiments within the spirit of the present invention. A part of the foregoing embodiment may be implemented in combinations as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008957, filed Jan. 20, 2015, which is hereby incorporated by reference herein in its entirety.

What is claimed is:

1. A focus control apparatus, comprising:
at least one processor or at least one circuit programmed to function as:
an area setting unit that sets a plurality of divided areas by dividing an area in a first direction and in a second direction that is different from the first direction, the first direction corresponding to a direction in which a focus state is detected, and the plurality of divided areas corresponding to respective areas of an image sensor;
a focus detection unit that detects first information related to the focus state on the basis of a pair of image signals output from the respective areas of the image sensor corresponding to the respective divided areas;
a calculation unit that calculates defocus information on the basis of the first information; and
a control unit that performs focus control on the basis of the calculated defocus information, wherein
in a first mode in which the defocus information for the focus control is calculated by combining pieces of the first information detected in at least a part of the plurality of divided areas, the calculation unit calculates the defocus information by changing, in accordance with an image capturing condition, combination of the plurality of divided areas the pieces of the first information of which are to be combined.

2. The focus control apparatus according to claim 1, wherein the image capturing condition is light intensity of a subject, and wherein
in the first mode, the calculation unit sets, in accordance with the light intensity of the subject, the combination of the plurality of divided areas the pieces of the first information of which are to be combined.

3. The focus control apparatus according to claim 2, wherein
in the first mode, when the light intensity of the subject is determined to be low, the calculation unit calculates the defocus information by combining the pieces of the first information detected in divided areas arranged along the second direction among the plurality of divided areas.

4. The focus control apparatus according to claim 2, wherein
in the first mode, when the light intensity of the subject is not determined to be low, the calculation unit calculates the defocus information using the combination of the pieces of the first information of the divided areas arranged along the first direction among the plurality of divided areas.

5. The focus control apparatus according to claim 2, wherein in the first mode, when the light intensity of the subject is not determined to be low and reliabilities related to the image signals in divided areas arranged along the first direction among the plurality of divided areas are low, the calculation unit calculates the defocus information by combining the pieces of the first information detected in the divided areas arranged along the first direction and in divided areas arranged along the second direction among the plurality of divided areas.

6. The focus control apparatus according to claim 1, wherein the image capturing condition is contrast of a subject, and wherein
in the first mode, the calculation unit sets, in accordance with the contrast of the subject, the combination of the plurality of divided areas the pieces of the first information of which are to be combined.

7. The focus control apparatus according to claim 6, wherein
in the first mode, when the contrast of the subject is determined to be low, the calculation unit calculates the defocus information by combining the pieces of the first information detected in divided areas arranged along the second direction among the plurality of divided areas.

8. The focus control apparatus according to claim 6, wherein
in the first mode, when the contrast of the subject is not determined to be low, the calculation unit calculates the defocus information using the combination of the pieces of the first information of the divided areas arranged along the first direction among the plurality of divided areas.

9. The focus control apparatus according to claim 6, wherein
in the first mode, when the contrast of the subject is not determined to be low and reliabilities related to the image signals in divided areas arranged along the first direction among the plurality of divided areas are low, the calculation unit calculates the defocus information by combining the pieces of the first information detected in the divided areas arranged along the first direction and in divided areas arranged along the second direction among the plurality of divided areas.

10. The focus control apparatus according to claim 1, wherein
in the first mode, the calculation unit calculates the defocus information by combining the pieces of the first information detected in divided areas included in a predetermined range among the plurality of divided areas.

11. The focus control apparatus according to claim 10, wherein
the predetermined range varies in accordance with the image capturing condition.

12. The focus control apparatus according to claim 1, wherein
each piece of the first information is related to a correlation amount indicating a degree of correlation between the corresponding pair of image signals.

13. The focus control apparatus according to claim 12, wherein
in the first mode, the calculation unit merges the correlation amounts detected in the plurality of divided areas, and calculates the defocus information on the basis of the merged correlation amounts.

14. The focus control apparatus according to claim 11, wherein the predetermined range is set to be larger when light intensity of a subject is determined to be low than when the light intensity of the subject is not determined to be low.

15. The focus control apparatus according to claim 11, wherein
the predetermined range is set to be larger when contrast of a subject is determined to be low than when the contrast of the subject is not determined to be low.

16. The focus control apparatus according to claim 10, wherein
the predetermined range is set to be larger when the calculation unit calculates the defocus information by combining the pieces of the first information than when the calculation unit calculates the defocus information without combining the pieces of the first information.

17. The focus control apparatus according to claim 1, wherein
when reliabilities related to the image signals in the divided areas are low, the calculation unit calculates the defocus information in the first mode, whereas when the reliabilities related to the image signals in the divided areas are high, the calculation unit calculates the defocus information in a second mode, and
in the second mode, the calculation unit calculates the defocus information for the focus control without combining the pieces of the first information detected in the plurality of divided areas.

18. The focus control apparatus according to claim 1, wherein
the second direction is perpendicular to the first direction.

19. The focus control apparatus according to claim 1, further comprising
an image sensor including a plurality of pixel units, wherein
each pixel unit is provided with a plurality of light receiving units corresponding to one microlens.

20. The focus control apparatus according to claim 1, further comprising
an image sensor including a plurality of pixel units, each pixel unit being provided with one microlens and one light receiving unit, wherein
a position of an aperture for the light receiving unit corresponding to the microlens varies among the pixel units included in the image sensor.

21. A focus control method, comprising:
setting a plurality of divided areas by dividing an area in a first direction and in a second direction that is different from the first direction, the first direction corresponding to a direction in which a focus state is detected, and the plurality of divided areas corresponding to respective areas of an image sensor;
detecting first information related to the focus state on the basis of a pair of image signals output from the respective areas of the image sensor corresponding to the respective divided areas;
calculating defocus information on the basis of the first information; and
performing focus control on the basis of the calculated defocus information, wherein
in a first mode in which the defocus information for the focus control is calculated by combining pieces of the first information detected in at least a part of the plurality of divided areas, the calculating calculates the defocus information by changing, in accordance with an image capturing condition, combination of the plurality of divided areas the pieces of the first information of which are to be combined.

22. A non-transitory computer-readable storage medium having stored therein a program for causing a computer to execute a focus control method, the method comprising:

setting a plurality of divided areas by dividing an area in a first direction and in a second direction that is different from the first direction, the first direction corresponding to a direction in which a focus state is detected, and the plurality of divided areas corresponding to respective areas of an image sensor;

detecting first information related to the focus state on the basis of a pair of image signals output from the respective areas of the image sensor corresponding to the respective divided areas;

calculating defocus information on the basis of the first information; and performing focus control on the basis of the calculated defocus information, wherein in a first mode in which the defocus information for the focus control is calculated by combining pieces of the first information detected in at least a part of the plurality of divided areas, the calculating calculates the defocus information by changing, in accordance with an image capturing condition, combination of the plurality of divided areas the pieces of the first information of which are to be combined.

* * * * *